US011412674B1

(12) United States Patent
Montezano, III

(10) Patent No.: US 11,412,674 B1
(45) Date of Patent: Aug. 16, 2022

(54) AUTOMATED AQUAPONICS SYSTEM

(71) Applicant: Blas R. Montezano, III, Hialeah, FL (US)

(72) Inventor: Blas R. Montezano, III, Hialeah, FL (US)

( * ) Notice: Subject to any disclaimer, the term of this patent is extended or adjusted under 35 U.S.C. 154(b) by 235 days.

(21) Appl. No.: 16/821,894

(22) Filed: Mar. 17, 2020

(51) Int. Cl.
*A01G 31/04* (2006.01)
*A01K 63/04* (2006.01)
*B23K 26/38* (2014.01)
*A01D 46/30* (2006.01)
*A01K 61/85* (2017.01)

(52) U.S. Cl.
CPC ............ *A01G 31/042* (2013.01); *A01D 46/30* (2013.01); *A01K 61/85* (2017.01); *A01K 63/04* (2013.01); *B23K 26/38* (2013.01)

(58) Field of Classification Search
CPC ...... A01G 31/042; A01K 61/85; A01K 63/04; A01D 46/30
See application file for complete search history.

(56) References Cited

U.S. PATENT DOCUMENTS

| | | | |
|---|---|---|---|
| 5,636,472 A * | 6/1997 | Spira | A01G 31/02 210/150 |
| 8,677,942 B2 | 3/2014 | Bodlovich et al. | |
| 8,966,816 B2 | 3/2015 | Toone et al. | |
| 2015/0196002 A1* | 7/2015 | Friesth | A01G 31/00 315/297 |
| 2016/0192594 A1* | 7/2016 | Mawendra | A01G 31/042 47/1.7 |
| 2016/0219811 A1* | 8/2016 | Kati | A01D 44/00 |
| 2018/0042192 A1* | 2/2018 | Volpe | A01G 31/04 |
| 2019/0259108 A1* | 8/2019 | Bongartz | A01G 31/02 |

\* cited by examiner

*Primary Examiner* — Monica L Barlow
(74) *Attorney, Agent, or Firm* — Joycelyn S. Brown

(57) ABSTRACT

An automated aquaponics system and method of use comprising an autonomously operated plant growing conveyor belt system that allows the plant to germinate from seed capsules to fully grown plants that are then fully harvested for consumption while the plant roots are cut, chopped, cooked, and processed for the appropriate consumption of the aquarian species that resides within the aquaponic ecosystem.

10 Claims, 5 Drawing Sheets

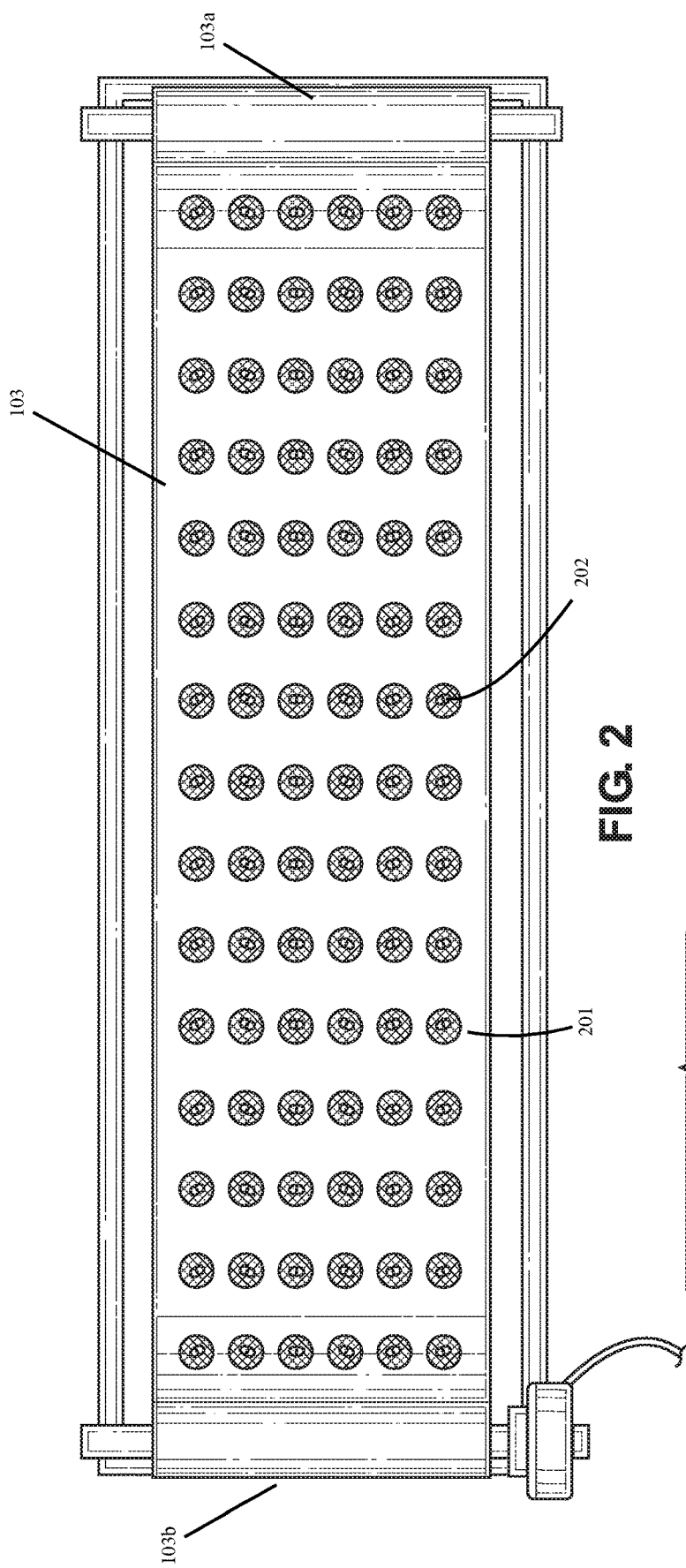
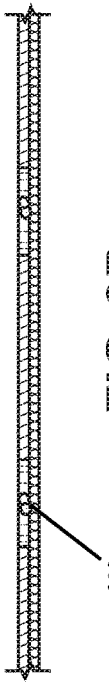
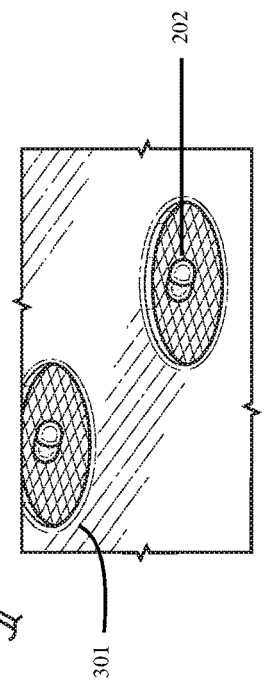
FIG. 2
FIG. 3A
FIG. 3B

AUTOMATED AQUAPONICS SYSTEM

CROSS-REFERENCE TO RELATED APPLICATION

Not applicable.

TECHNICAL FIELD

The present invention relates generally to systems and methods for provided a self-contained system that may be used to grow plants and fish. More specifically, the present invention relates to an automated self-contained ecosystem and the system and method of use.

BACKGROUND

Aquaponics is defined as the combination fish farming (aquaculture) and soil-less plant culture (hydroponics). Aquaponics is a symbiotic system that utilizes the excrement of aquarian species, which is then fermented, broken down with living enzymes and bacteria, and turned into the necessary nutrients for plants to grow. The plants, in turn, filter the water and provide root-based nutrients for the aquarian species. The natural microbial process creates a sustainable ecosystem where both plants and fish can thrive.

Aquaponic systems that are currently on the market and available for commercial use have three primary drawbacks: (1) they require significant land use, (2) they consume several hundred gallons of water, and (3) the technology does not allow of complete automation.

Various attempts have been made, although unsuccessfully, to solve the drawbacks of the traditional aquaponic systems. One illustrative attempt can be seen with respect to U.S. Pat. No. 8,966,816 B2, which generally discloses an aquaponics system that can be maintained in homes, businesses and classroom in a relatively small area. While this disclosure does address the land use issue of traditional aquaponic systems, and by default water consumption, it fails to disclose a fully autonomous system.

Another example can be seen with respect to U.S. Patent Application No. 2015/019600 A1 which generally discloses an automated hybrid aquaponics and bioreactor system. While this disclosure does address the need to automate aquaponic systems the disclosure still requires the need for human interaction and operation.

Another example can be seen with respect to U.S. Pat. No. 8,677,942 B2, which generally discloses an aquaponics system and method. While this disclosure does address the land use and water consumption drawbacks of traditional aquaponic systems, it does not address the lack of automation in traditional systems.

As can be seen, various attempts have been made to solve the problems which may be found in the related art but have been unsuccessful. A need exists for a new and novel automated aquaponics system.

SUMMARY OF THE INVENTION

It is to be understood that in the present disclosure, all embodiments are provided as illustrative and non-limiting representatives of many possible embodiments. In addition, the terms "is," "can," "will," and the like are herein used as synonyms for and interchangeable with terms such as "may," "may provide for," and "it is contemplated that the present invention may" and so forth.

Furthermore, all elements listed by name, such as a tank, aquarian species, belt, laser and so forth are herein meant to include or encompass all equivalents for such elements. Such equivalents are contemplated for each element named in its particular herein.

For purposes of summarizing, certain aspects, advantages, and novel features of the present invention are provided herein. It is to be understood that not all such aspects, advantages, or novel features may be provided in any one particular embodiment. Thus, the disclosed subject matter may be embodied or carried out in a manner that achieves or optimizes one aspect, advantage, or novel feature or group of features without achieving all aspects, advantages, or novel features as may be taught or suggested.

In view of the foregoing disadvantages inherent in the known art, the present invention relates to an automated aquaponics system that overcomes the deficiencies of the prior art. The general purpose of the present invention, which shall be described subsequently in greater detail, is to provide an autonomous farming technology for commercial and individual scale applications.

The features of the invention which are believed to be novel are particularly pointed out and distinctly claimed in the concluding portion of the specification. By way of non-limiting example, the present invention provides a novel solution for autonomous farming technology for commercial and individual scale applications. These and other features, aspects, and advantages of the present invention will become better understood with reference to the following drawings and detailed description.

The present invention comprises an autonomous farming technology for commercial and individual scale applications and the method of use. The present invention provides for an automated aquaponics system including a take for housing at least one aquarian species, a conveyor belt, at least one laser cutter, at least one recycling compartment, sorting trays, at least one robotic arm pattern recognition camera, and at least one sensor.

In preferred embodiments, the automated aquaponics system includes a conveyor belt that is equipped with growing cells. In some embodiments, the conveyor belt is positioned across the aquaponics tank and is made from recycled and durable polyurethane, polyisocyanurate or other polymer or combination of polymers. The growing cells allow for the automated aquaponics system to germinate and grow plants from a preset growing capsule. Each capsule may be made up of the essential elements needed to grow a plant. In preferred embodiments, the conveyor belt is attached at both ends of the tank, allowing for a "roll-out, roll-in" system. The conveyor belt roll, placed in its corresponding holder, extends the roll from one side of the tank to the other allowing the conveyor belt material to hover freely over the tank. In the first growth phase, the growing capsule is autonomously subjected to a specific pre-set climate and misted with water and necessary minerals. In the second growth phase, growing cells are positioned beneath the surface level of the talk water allowing for the then sprouted capsules withstand the full nutrients of the ecosystem.

In some embodiments, the conveyor belt and the tank are monitored by an autonomously operated robotic arm that is equipped with pattern recognition software and a camera that collects data including data to maximize the life of the aquarian species as well as the growth of the plants. In a preferred embodiment, the camera captures a plurality of images of the plant growth daily and autonomously measures the growth rate and sends feedback to the system computer which determines the harvesting schedule. The autonomously operated robotic arm conducts a variety of functions including plant care, plant harvesting, aquarian species care, removal and harvesting, as well as tank cleaning.

In other embodiments, a carbon dioxide laser cutter is fixedly connected to one end of the conveyor belt. In preferred embodiments, when the conveyor belt mechanics are engaged and activated, the conveyor belt rolls out towards the laser cutter. The laser cutter allows for the fully automated plant harvesting as the laser trims the roots from the plant. While the conveyor belt mechanics are engaged and activated, the autonomous aquaponics system allows for the plant roots to be collected into a recycling compartment which are then fed to a chopping container. In some embodiments, the chopping container is pre-programmed to chop the plant roots to a specific size based on the stage of life of the aquarian species in the closed aquaponics ecosystem. Once chopped to the appropriate size, the chopped roots are then autonomously cooked, sprayed with additives and nutrients, and then fed to the aquarian species through dispensing containers that are fixedly connected to the tank.

In some embodiments, the harvested plants are dropped from the conveyor belt into sorting and collection trays. An autonomously operated robotic arm places each plant into a bag or equivalent containment where are prefilled with nutrients and water to allow the plant growth to continue.

The embodiments of the invention described herein are exemplary and numerous modifications, variations and rearrangements can be readily envisioned to achieve substantially equivalent results, all of which are intended to be embraced within the spirit and scope of the invention. Furthermore, while the preferred embodiment of the invention has been described in terms of the components and configurations, it is understood to that the invention is not intended to be limited to those specific dimensions or configurations but is to be accorded the full breadth and scope of the spirit of the invention.

BRIEF DESCRIPTION OF THE DRAWINGS

These and other features, aspects and advantages of the present invention will become better understood with regard to the following description, appended claims, and accompanying figures where:

FIG. 2 shows a top view of the conveyor belt of an autonomous aquaponics system in accordance with an embodiment of the present invention.

FIG. 3A shows an exploded perspective view of a growing cell of an autonomous aquaponics system in accordance with an embodiment of the present invention.

FIG. 3B shows an exploded side view of an autonomous aquaponics system in accordance with an embodiment of the present invention.

DETAILED DESCRIPTION

The present invention overcomes the limitations of the prior art by providing a new and more effective patient lifting device.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any embodiment or element of an embodiment disclosed in this disclosure will be determined by its intended use.

It is to be understood that the drawings and the associated descriptions are provided to illustrate potential embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known features, elements or techniques may not be shown in detail in order not to obscure the embodiments.

Figure 1:
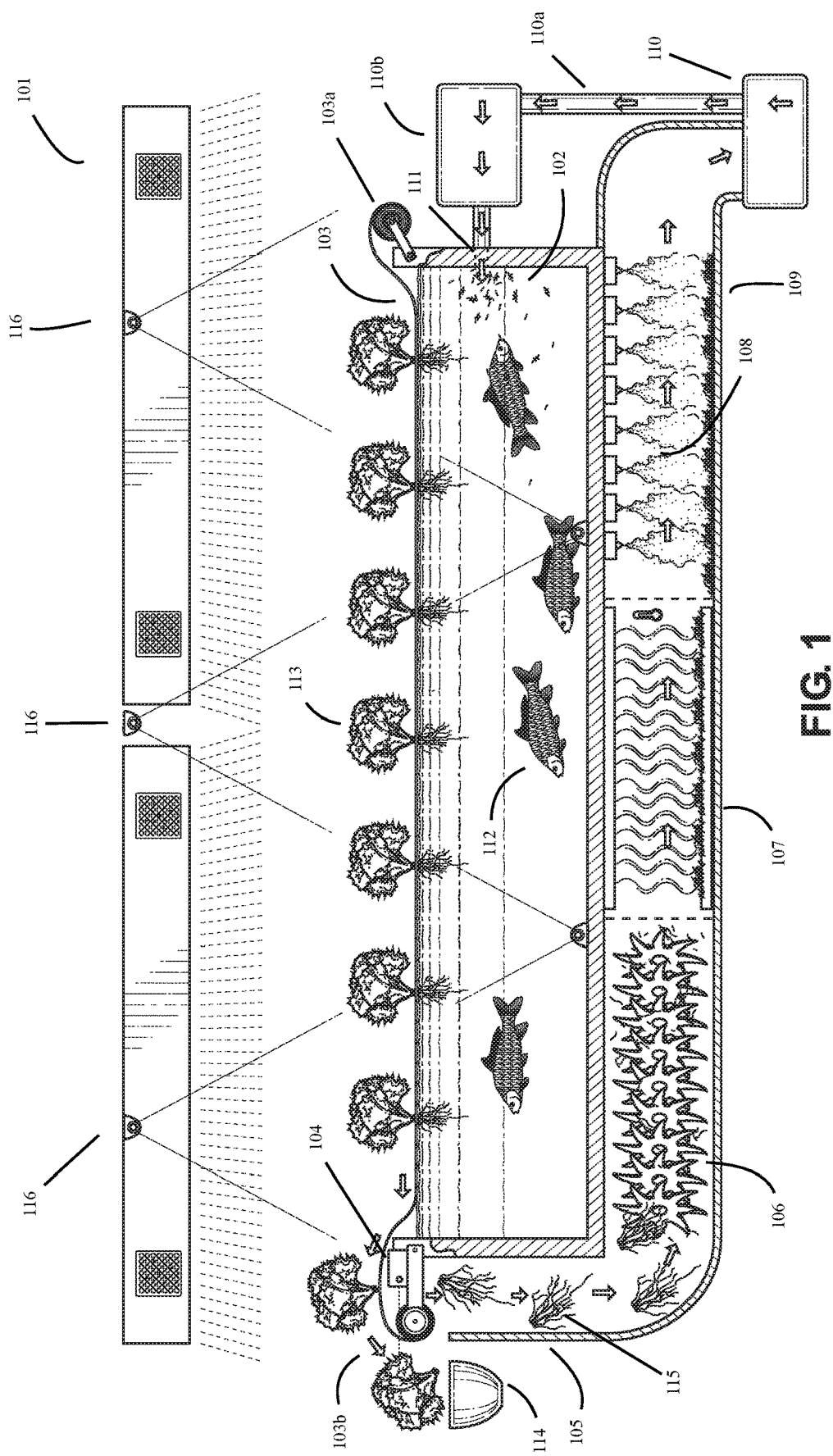
FIG. 1 shows a cross-sectional view of a autonomous aquaponics system in accordance with an embodiment of the present invention.

Turning attention to FIG. 1, a cross-section of an autonomous aquaponics system 101 in accordance with at least one embedment of the present invention is shown and comprises of a rectangular shaped tank 102 with a conveyor belt 103 positioned over the opening of the tank 102. A viewer may perceive that the conveyor belt 103 has a first end 103a and a second end 103b whereby the second end 103b is fixedly attached to a laser cutter 104. A viewer may also perceive that the opening of the recycling compartment 105 is directly under the second end 103b of the conveyor belt 103 and flows underneath the tank 102.

When the conveyor belt 103 is activated, the plants 113 move along the conveyor belt 103 towards the second end 103b towards the laser cutter 104 as the laser cutter 104 cuts the plant roots 115. The plant 113 is harvested and falls into a storage container 114 and the plant roots 115 fall into the recycling compartment 105. Once the plant roots 115 move towards a blade chopper 106 where the plant roots 105 are chopped into edible sizes for the aquarian species 112 in the tank 102. The chopped plant roots 109 are then baked in the oven station 107 and are then moved into a spraying station 108 where they are coated with additives.

A viewer may also perceive that the chopped plant roots 109 are moved into a vacuum sealed storage container 110. When the aquarian species 112 requires food the vacuum sealed storage container 110 sends the chopped plant roots 109 through the vertical tube 110a to a feed container 110b and through the feeding dispenser 111 into the tank 102 where the aquarian species 112 receive the chopped plant roots 109 for consumption. This harvesting process is managed by autonomous robots (not shown) with cameras 116.

Turning to FIG. 2, a top view of the conveyor belt 103 of an autonomous aquaponics system in accordance with an embodiment of the present invention is shown. In the embodiment depicted, a viewer may perceive that the conveyor belt 103 is equipped with a plurality of growing cells 201. The growing cells 201 house the growing capsule 202 which is prefilled with essential minerals and fertilizers (not shown) necessary to germinate each capsule.

Figure 5A:
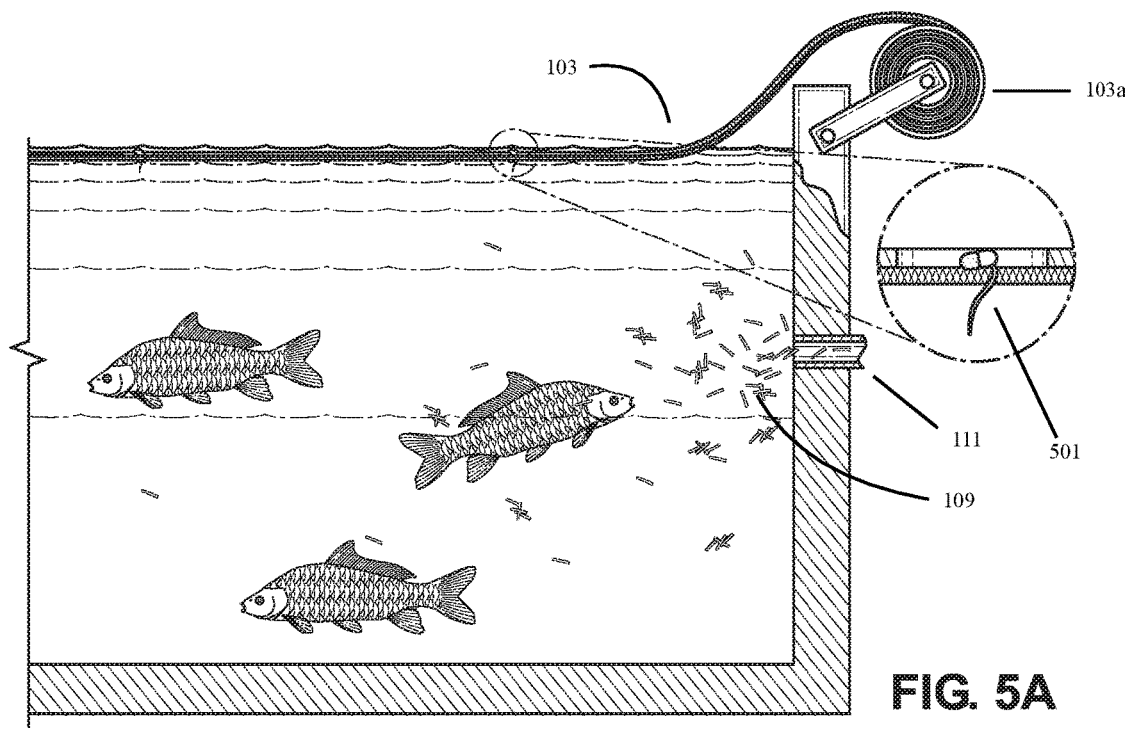
FIG. 5A shows a cross-sectional exploded view of a sprouted growing capsule of an autonomous aquaponics system in accordance with an embodiment of the present invention.

In FIG. 3A shows an exploded perspective view of a growing cell 201 of an autonomous aquaponics system in accordance with an embodiment of the present invention is shown. A viewer may perceive that the growing cell 201 has a mesh-like base 301 that allows for the growing capsule 202 to be submerged in the tank 102, as shown in FIG. 5A. In FIG. 3B, a viewer may perceive that the growing cell 201 allows the growing capsule 202 to be positioned below the surface area of the conveyor belt 103.

Figure 4:
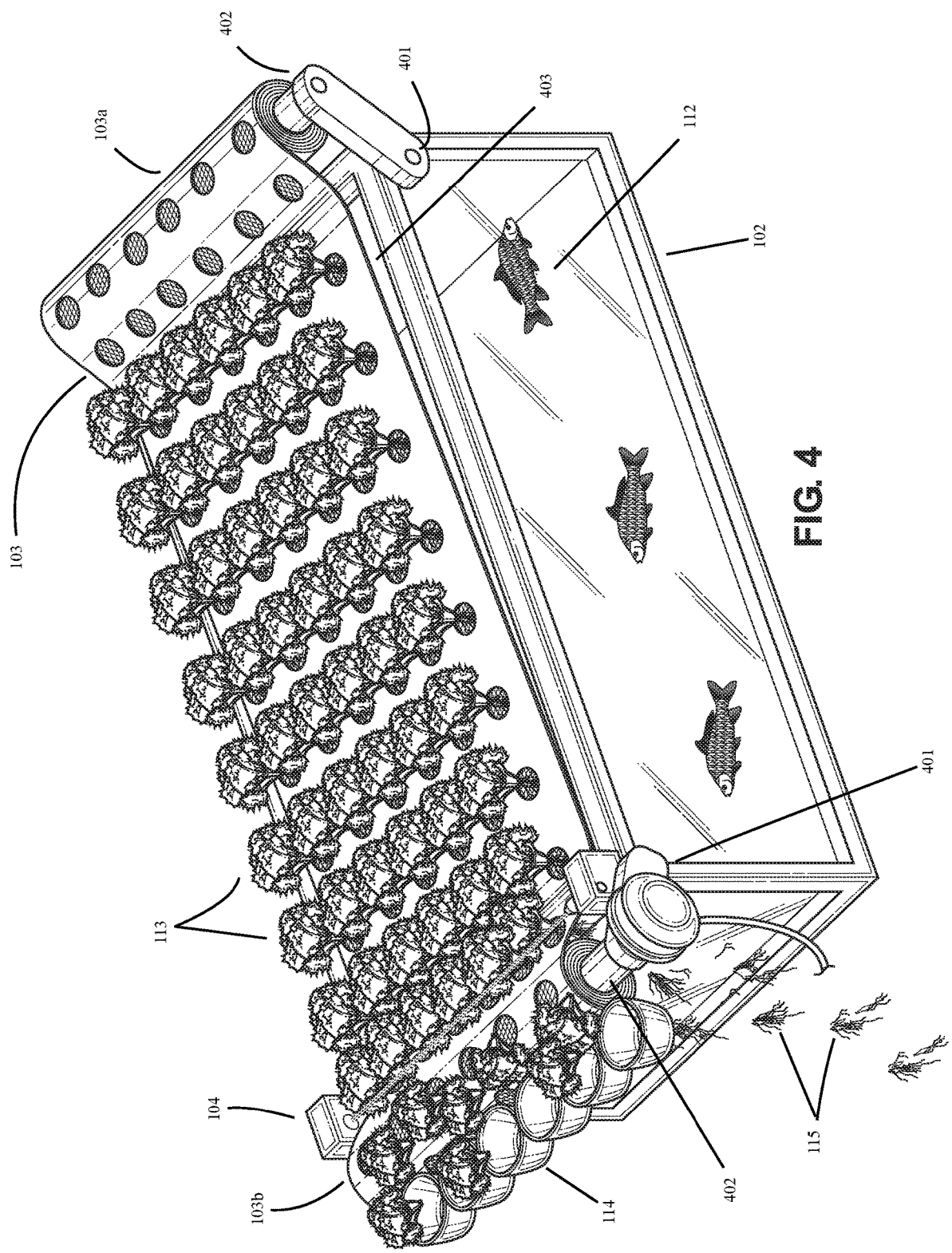
FIG. 4 shows a perspective view of an autonomous aquaponics system in accordance with an embodiment of the present invention.

Turning to FIG. 4, a perspective view of an autonomous aquaponics system 101 in accordance with an embodiment of the present invention is shown. In the embodiment shown, a viewer may perceive that the first end 103a and the second end 103b of the conveyor belt 103 is fixedly connected to the tank 102 by and through a bracket 401 and a pole 402. The conveyor belt 103 is rolled over the pole 402. When the autonomous aquaponics system 101 is activated for harvesting, the conveyor belt 103 motor (not shown) rolls the conveyor belt 103 out from the pole 402 of the first end 103a while the pole 402 of the second end 103b rolls the conveyor belt 103 in. A viewer may also perceive that the conveyor belt 103 is positioned over the top opening 403 of the tank 102.

Figure 5B:
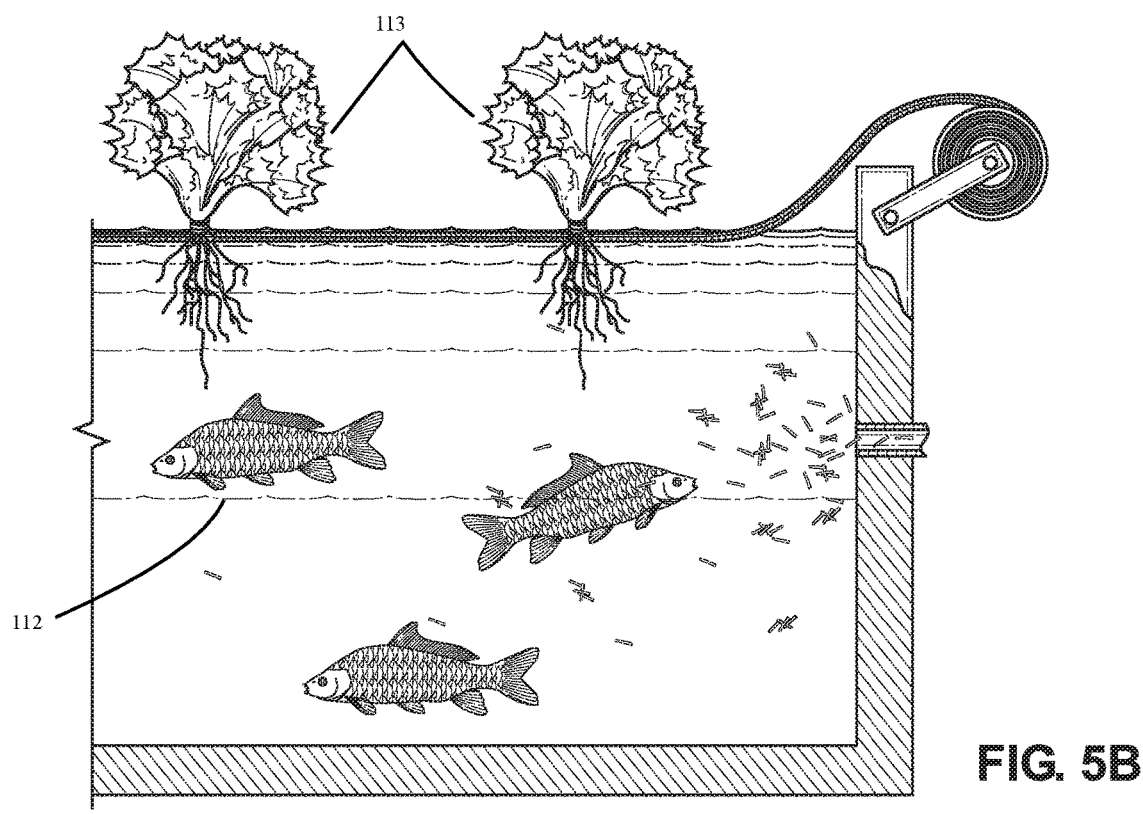
FIG. 5B shows cross-sectional exploded view of a fully grown plant of an autonomous aquaponics system in accordance with an embodiment of the present invention.

In FIG. 5A a cross-sectional exploded view of a sprouted growing capsule 501 of an autonomous aquaponics system 101 in accordance with an embodiment of the present invention is shown. Once the growing capsule 202 has sprouted 501 the present invention allows for the conveyor belt 103 motor (not shown) to lower the conveyor belt 103 into the surface water of the tank 102. As shown in FIG. 5B, the plants 113 continue to grow as the roots 115 continue to be submerged in the tank 102 water over the plant's 113 growth cycle.

Figure 6:
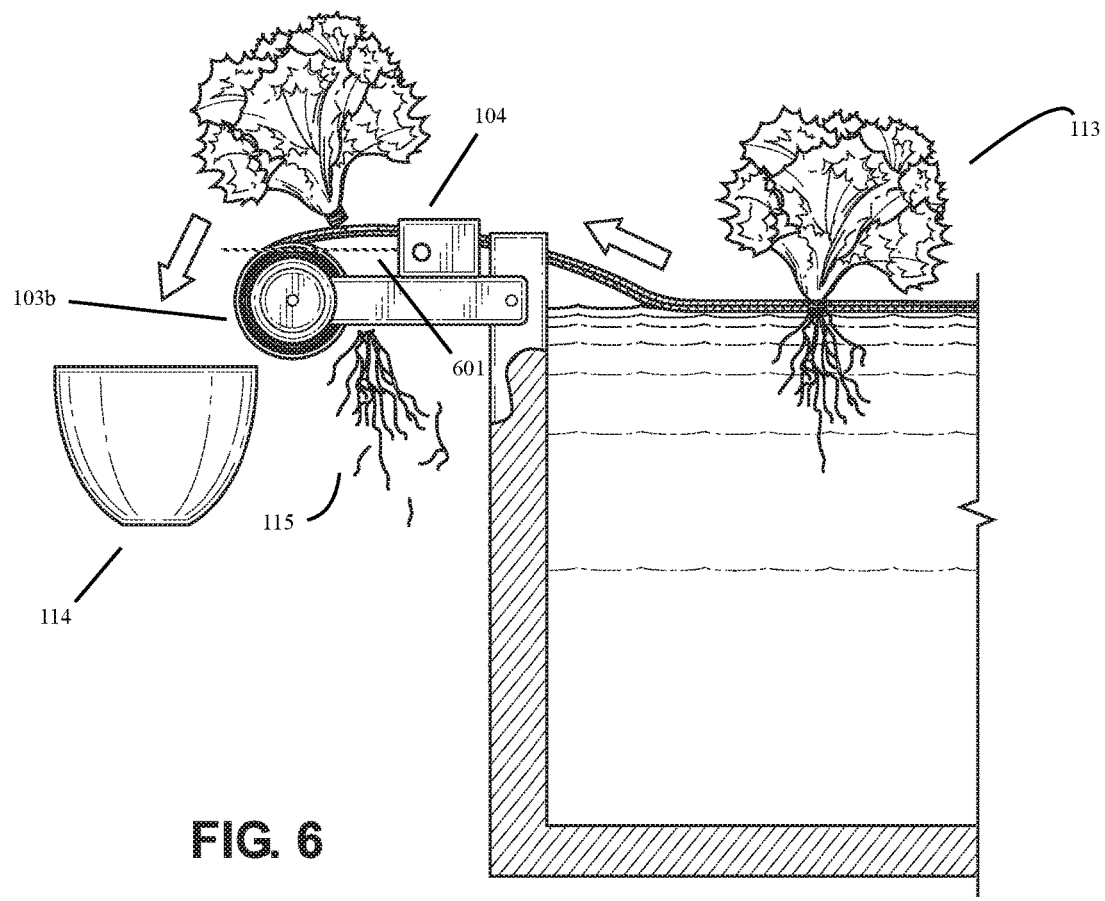
FIG. 6 shows an exploded cross-sectional view of a laser cutter while in use of the autonomous aquaponics system in accordance with an embodiment of the present invention.

Turning to FIG. 6, an exploded cross-sectional view of a laser cutter 104 while in use of the autonomous aquaponics system 101 in accordance with an embodiment of the present invention is shown. When the conveyor belt 103 is activated for harvesting, the plant 113 moves towards the rear end 103b of the conveyor belt 103 where the CO2 laser 601 cuts through the plant root 115. The plant 113 falls into the collection bin 114 while the plant root 115 falls into the recycling compartment (not shown).

Figure 7:
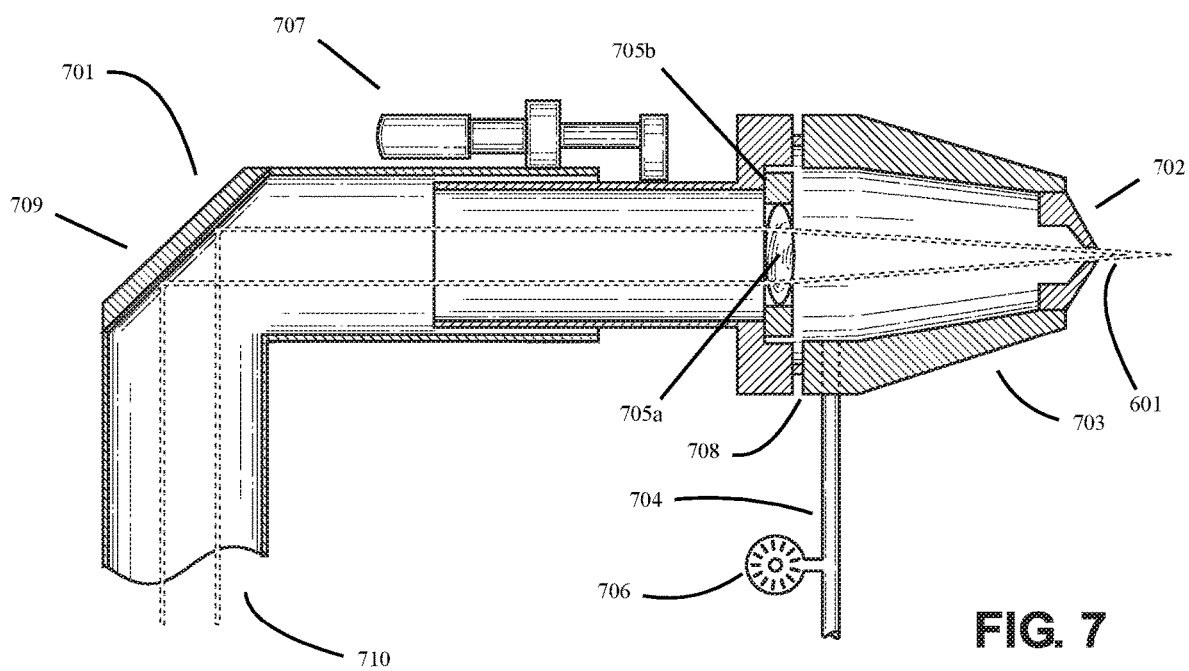
FIG. 7 shows an exploded cross-sectional view of a laser cutter of an autonomous aquaponics system in accordance with an embodiment of the present invention.

The laser cutter 701 as shown in FIG. 7 is comprised of a nozzle 702, a head member 703, a cutting gas inlet 704, a lens 705a and lens mount 705b, a pressure gauge 706, a manual or automatic height adjustment 707, a seal 708, and a flight tube 709.

CONCLUSIONS, RAMIFICATIONS, AND SCOPE

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

While the present invention generally described herein has been disclosed in connection with a number of embodiments shown and described in detail, various modifications should be readily apparent to those of skill in the art.

What is claimed is:

1. An automated aquaponics system comprising:
   at least one tank to house at least one aquarian species;
   at least one tank to house water;
   a conveyor belt, wherein the conveyor belt is positioned over the at least one tank to house at least one aquarian species;
   a laser cutter, wherein the laser cutter is attached to one end of the conveyor belt;
   a collecting bin; and
   at least one robotic arm for conducting a variety of functions including plane care, plant harvesting, aquarian species care, removal and harvesting, as well as tank cleaning.

2. The automated aquaponics system of claim 1 wherein the laser cutter is fixedly attached to the at least one tank that houses at least one aquarian species such that the laser cutter is adjacent to the rear end of the conveyor belt.

3. The automated aquaponics system of claim 1 wherein the at least one robotic arm comprises of at least one camera.

4. The automated aquaponics system of claim 3 wherein the at least one camera of the at least one robotic arm monitors the plant growth of the autonomous aquaponics system and sends feedback to a system computer which determines a harvesting schedule.

5. The automated aquaponics system of claim 1 wherein the conveyor belt comprises a front end, a rear end, a motor, and plurality of plant growing cells along the body of the conveyor belt.

6. The automated aquaponics system of claim 5 wherein the growing cells are circular in shape and are at least 2 inches in diameter and at least % inch deep.

7. The automated aquaponics system of claim 4 wherein the base of the growing cells are comprised of an open mesh-like material allowing water to penetrate the base of the growing cell thereby allowing a plant to receive sufficient water.

8. The automated aquaponics system of claim 5 wherein the front end and rear end of the conveyor belt are fixedly connected to a rolling pin allowing the conveyor belt to roll back and forth on a horizontal plane that is parallel to the opening of the tank to house at least one aquarian species.

9. The automated aquaponics system of claim 8 wherein the plant roots are cut by the laser cutter and at least one plant rolls off the conveyor belt and into the at least one collection bin.

10. The automated aquaponics system of claim 5 wherein the conveyor belt, when filled with at least one fully grown plant that is ready to be harvested, is autonomously activated and moves on a horizontal plane towards the rear end of the conveyor belt.

\* \* \* \* \*